United States Patent [19]

Welsh et al.

[11] Patent Number: 4,479,666
[45] Date of Patent: * Oct. 30, 1984

[54] LOAD-LINE FASTENER

[76] Inventors: James W. Welsh, 1350 Loring St., San Diego, Calif. 92109; Robert A. Anderson, 1481 Anita St., Carpenteria, Calif. 93013

[*] Notice: The portion of the term of this patent subsequent to Jan. 12, 1999 has been disclaimed.

[21] Appl. No.: 335,230

[22] Filed: Dec. 28, 1981

Related U.S. Application Data

[63] Continuation of Ser. No. 101,204, Dec. 7, 1979, Pat. No. 4,310,181.

[51] Int. Cl.³ ............................................. F16L 35/00
[52] U.S. Cl. ......................................... 285/4; 285/39; 285/93; 285/175; 285/332; 285/355; 285/370; 411/10
[58] Field of Search ...................... 285/93, 175, 4, 332, 285/334.1, 334.2, 355, 370, 372, 390, 392, 397, 418, 39; 411/10, 11

[56] References Cited

U.S. PATENT DOCUMENTS

| | | | |
|---|---|---|---|
| 720,578 | 2/1903 | Greenfield | 285/DIG. 7 |
| 1,562,373 | 11/1925 | Sheldon | 285/175 |
| 1,583,126 | 5/1926 | Crain | 285/175 |
| 2,046,571 | 7/1936 | McCain | 285/175 |
| 2,298,516 | 10/1942 | Streib | 285/175 X |
| 2,766,998 | 10/1956 | Watts et al. | 285/372 |
| 3,306,154 | 2/1967 | Bailey | 411/11 |
| 3,323,403 | 6/1967 | Wattsman | 411/10 |
| 3,406,989 | 10/1968 | Gross | 285/175 X |
| 3,441,292 | 4/1969 | Gross | 285/355 X |
| 3,701,550 | 10/1972 | Jacobson | 285/175 X |

Primary Examiner—Dave W. Arola
Attorney, Agent, or Firm—William W. Haefliger

[57] ABSTRACT

A fastening assembly includes:
(a) an axially elongated fastener having axially spaced differentially threaded portions respectively adapted to threadably engage threaded extents on members to be interconnected, and
(b) structure extending at the side of the fastener and having interconnection therewith characterized as facilitating transmission of torque to the fastener to rotate the fastener about the axis while allowing relative axial displacement between the fastener and the structure, whereby the threaded portions are then adapted to threadably interfit the threaded extents to make-up the assembly.

18 Claims, 8 Drawing Figures

LOAD-LINE FASTENER

This is continuation of application Ser. No. 101,204, filed Dec. 7, 1979 now Pat. No. 4,310,181.

BACKGROUND OF THE INVENTION

This invention relates generally to fasteners, and more particularly concerns an improved fastener assembly characterized by better stress distribution than has previously been possible, and by ease of make-up of the assembly providing a line-of-force interconnection between members being joined together. Such ease of make-up is facilitated by providing access to the side of the assembly for torque application.

It is desirable when interconnecting structural members to provide uniform stress distribution 360° around the line of force through the fastener. This is not possible where conventional bolts are used to interconnect the ends or edge portions of such members. Thus, either a bolt insertion and wrenching pocket must be provided, or else offset flanges are required. In the case of a wrenching pocket, it is impossible to provide 360° stress distributions; and where offset flanges are employed, the desired direct line-of-force connection is forfeited by the unwanted bending stresses introduced in the resulting force couples which are additive to the necessary tensile stresses. In order to resist these bending deflections, flanges must be relatively thick, requiring longer, lower frequency bolts plus additional space and weight requirements.

SUMMARY OF THE INVENTION

It is a major object of the present invention to provide a fastener and fastener assembly characterized in their construction and functioning as overcoming the above problems and disadvantages. Basically, the invention is embodied in a fastening assembly which comprises:

(a) an axially elongated fastener having axially spaced differentially threaded portions respectively adapted to threadably engage threaded extents on members to be interconnected, and between the threaded portions and (b) means extending at the side of the fastener and having interconnection therewith characterized as transmitting torque to the fastener to rotate the fastener about said axis while allowing relative axial displacement between the fastener and said means, whereby said threaded portions are then adapted to threadably interfit said threaded extents to make-up the assembly.

As will appear, the torque transmitting means or turning element typically comprises an annulus extending about and in generally coaxial relation with the fastener, the interconnection between the annulus and fastener including interengageable shoulders such as flats keys or splines extending axially and spaced about the common axis; the initial displacement of the fastener is in a rearward direction and the forward threaded portion of the fastener typically has greater thread pitch than the rearward threaded portion of the fastener. After the initial rearward insertion of the fastener, it is reversed or "backed-out" of the first member at a slower rate than it is threaded into the member with the greater pitch. The assembly is "made up" and commences to bring the members together after the greater thread pitch end has threadably engaged the second member causing the interconnected members to relatively converge axially on the annulus.

The fastener may have a locally reduced precision cross section between the two threaded portions so as to ensure that failure is limited to that least cross section if it does ever fail, in response to tensile loading beyond that limited by the reduced section. The annulus, in addition, may have indicator grooving adapted to relatively close when predetermined clamping loading has been applied to it between the members interconnected by the fastener; or, a separate crushable washer may be employed to indicate the achievement of such loading.

In addition, the opposite end faces of the annulus may have flat surface 360° engagement with the members being joined together, or either one or both faces may have either male or famale conical shoulders, engaging oppositely oriented conical extents in the members to be interconnected. The fastener and such members to be joined may be tubular as well as solid, facilitating their use as in interconnecting hydraulic and pneumatic pipes, tubing and casings.

Torque capability of the fastener is not affected by the tensile load-limiting cross section. Similar reducing of a section of a conventional bolt between the head and threads in the grip range reduces the torque capacity of the bolt, i.e. the annulus applies torque equally and simultaneously between each of the differential threads and the reduced section.

These and other objects and advantages of the invention, as well as the details of an illustrative embodiment, will be more fully understood from the following specification and drawings, in which:

DRAWING DESCRIPTION

DETAILED DESCRIPTION

Figure 1:
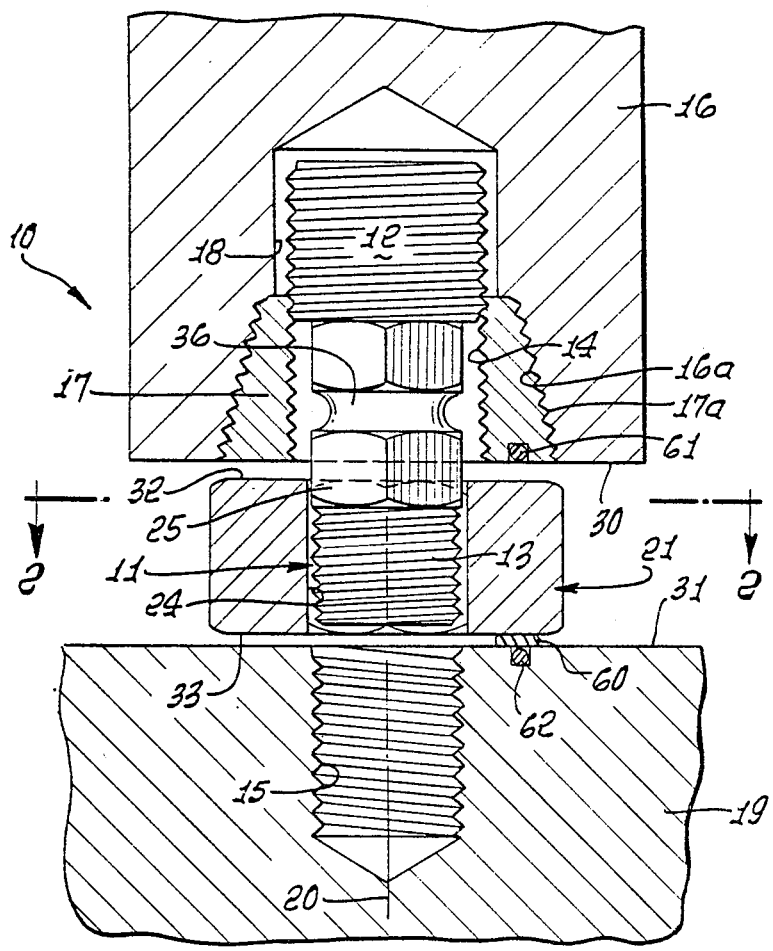
FIG. 1 is a vertical section through one form of fastening assembly incorporating the invention.
Figure 2:
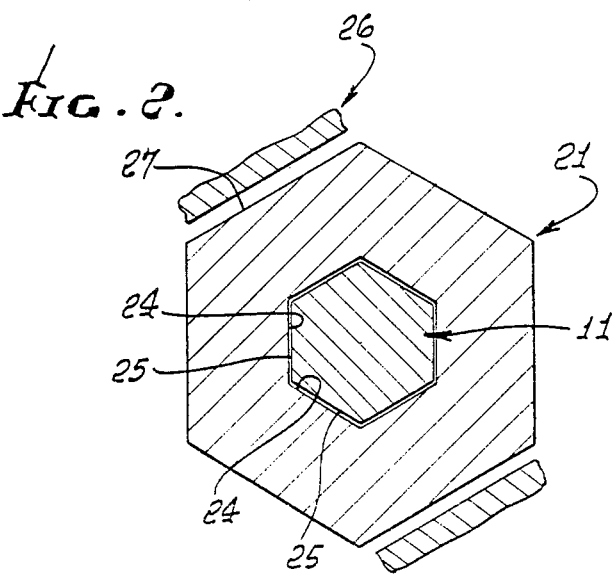
FIG. 2 is a horizontal section taken on lines 2—2 of FIG. 1.

Referring first to FIGS. 1 and 2, the fastener assembly 10 includes an axially elongated fastener 11 having axially spaced differentially threaded portions 12 and 13. These are respectively adapted to threadably engage threaded extents 14 and 15 on members to be interconnected. Accordingly, the fastener 11 may define a dually threaded bolt.

One of such members is shown to include an upper body 16 and an annular insert 17 therein, the insert defining internal threaded extent 14, and having a tapered exterior thread 17a interfitting internal thread 16a formed by the body 16. Body 16 also forms an upper internal recess 18 receiving the fastener threaded portion 12, whereby the latter is well protected. The other of such members is shown at 19, and defines interior cylindrical threaded extent 15.

The fastener assembly also includes means extending at the side of the fastener 11 and having interconnection therewith characterized as transmitting torque to the fastener to rotate it about axis 20, while at the same time allowing relative axial displacement between the fastener and such means, whereby the threaded portions 12 and 13 are then adapted to threadably interfit the threaded extents to make-up the assembly. One such means is shown to comprise an annulus 21 extending in generally coaxial relation with the fastener 11, the annulus typically extending about the fastener. As shown, the annulus and fastener have interengageable flats (indicated respectively at 24 and 25 in FIG. 2) to transmit torque to the fastener as the annulus is rotated. A suitable tool to rotate the annulus is indicated at 26, and the annulus may have external tool grippable flats at 27, and thus define a "NUT exterior". The annulus is shown in FIG. 1 as protectively enveloping fastener thread 13 to be advanced into threaded engagement with threaded portion 15 in response to rotating of the annulus.

The upper and lower members typically have shoulders, as at 30 and 31 between which loading is transmitted by the annulus as it is rotatably tightened to bring shoulders 30 and 31 relatively toward one another and into engagement with the top and bottom sides 32 and 33 of the annulus. At such time, threads 12 and 14 remain interengaged, and thread 13 and 15 are interengaged. To this end, axial displacement of the fastener is in a forward (downward in FIG. 1), fastener make-up direction, the forward threaded portion 13 of the fastener having greater thread pitch than the rearward threaded portion 12 of the fastener. Thus, as thread 13 is drawn into thread 15, the shoulders 30 and 31 are drawn relatively together. At make-up, a gap remains between those shoulders equal to the axial width of the annulus, to allow insertion and removal of the turning tool 26.

A precision, tension failure, annular groove 36 may be formed in and about the fastener intermediate extent between the threads 12 and 13, to ensure failure of the fastener at that location, and not at the threads. Such failure might occur for example in response to excessive tension loading tending to move body 16 axially away from member 19. The reduced cross section of the fastener inwardly of local region or groove 36 is of predetermined size, for that purpose.

The described system provides a maximum tensile load connection in a minimum "envelope"; also loading is evenly distributed 360° about the bolt or fastener 11.

Figure 3:
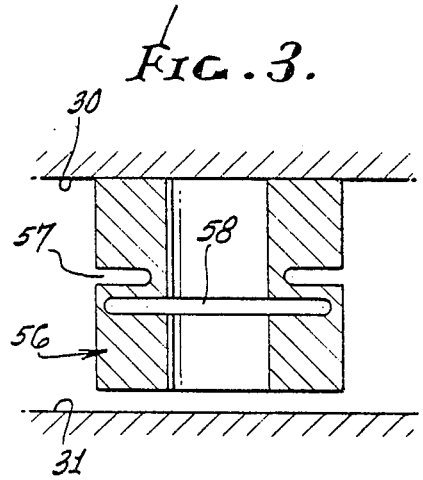
FIG. 3 is a vertical section through a modified fastener turning element.
Figure 4:
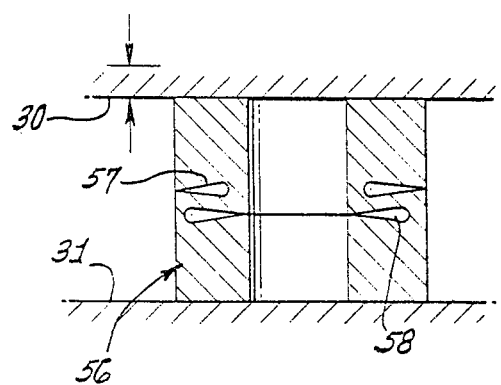
FIG. 4 is a view like FIG. 3 but showing the FIG. 3 turning element in axially compressed condition.

A crushable, torque indicating washer or washers can be employed between the annulus 21 and shoulder 31 (or shoulder 30) and as indicated at 60 to indicate precisely controlled make-up force application. A torque indicating annulus is shown at 56 in FIGS. 3 and 4, with annular side grooves 57 and 58. Those grooves collapse when full loading is achieved, axially (see FIG. 4). That annulus may be used in place of annulus 21. Also, O-rings can be employed, as indicated at 61 and 62 between the annulus and shoulders 30 and 31, to provide moisture and dust exclusion.

Figure 5:
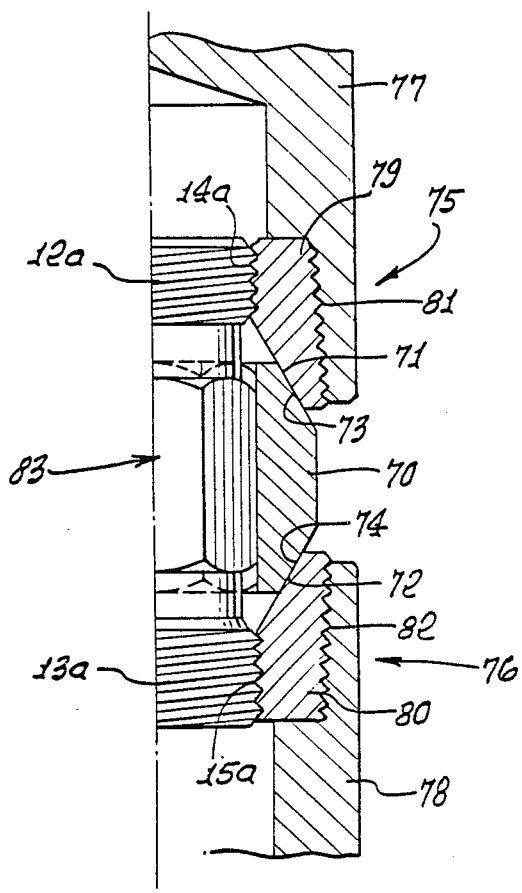
FIG. 5 is a view like FIG. 1 but showing a further modified fastening assembly.

Turning to FIG. 5, the annulus 70 corresponds to annulus 21 of FIG. 1; however, it has at least one and preferably two frusto-conically tapering end portions 71 and 72 adapted to interfit correspondingly frusto-conically tapered shoulders 73 and 74 defined by the members 75 and 76. In the illustrated embodiment, the members 75 and 76 respectively include bodies 77 and 78, and annular inserts 79 and 80 threaded therein, as at 81 and 82. The inserts define the internal threaded extends 14a and 15a (corresponding to extents 14 and 15 in FIG. 1) to which the fastener differentially threaded portions 12a and 13a (corresponding to portions 12 and 13 in FIG. 1) are respectively threadably engaged. Also, the inserts define the correspondingly frusto-conically tapered shoulders 73 and 74 referred to above. Other combinations of male and female conical interfits can be employed. In FIG. 5, the fastener 83 corresponds to fastener 11 of FIG. 1.

Figure 6:
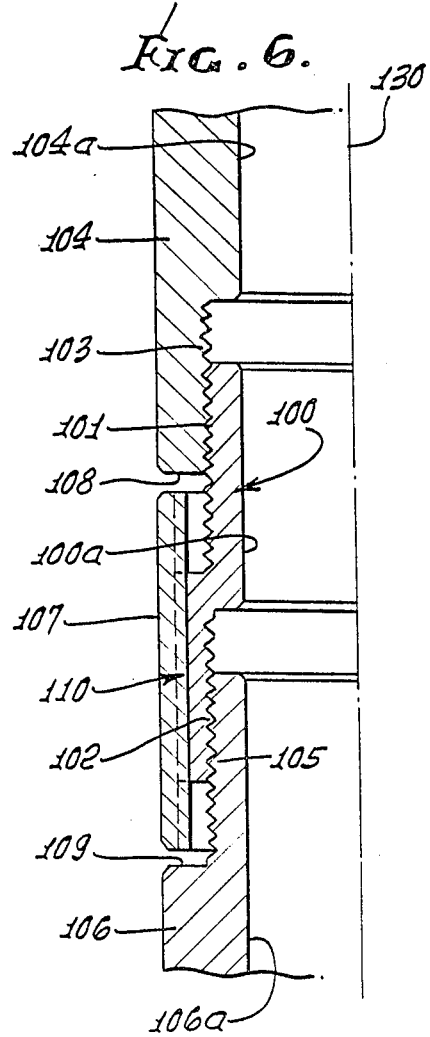
FIG. 6 is a view like FIG. 1 showing yet another modified fastener assembly, holding pipe sections together.

The form of the invention shown in FIG. 6 includes a tubular fastener 100 having axially spaced, differentially threaded portions 101 and 102. Externally threaded portion 101 interfits internally threaded extent 103 on upper tubular member 104; and internally threaded portion 102 interfits externally threaded extent 105 on lower tubular member 106. The center line is at 130. Threads 102 and 105 typically have greater pitch than threads 101 and 103, so that the joint is made up, shoulders 108 and 109 moving relatively together clamp annulus 107 endwise therebetween. Annulus 107 has axial tongue and groove sliding interfit with the fastener 100, at 110, whereby the annulus and fastener are relatively axially slidable, but are rotatably intercoupled, to transmit torque from the annulus to the fastener. The common continuous bore diameters of the annulus and tubular members facilitates passage of well tools therethrough, in cases where the members comprise well pipe. See bores 104a, 100a and 106a.

Figure 7:
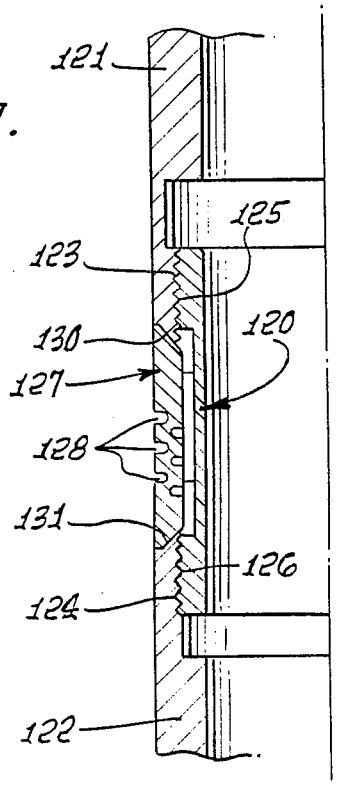
FIG. 7 is a view like FIG. 6, but showing a different form of fastener assembly, holding pipe sections together.

In FIG. 7 the fastener 120 and upper and lower members 121 and 122 are again coaxial and tubular; however, the fastener differentially threaded portions 123 and 124 are external threads, and the member threaded portions 125 and 126 are internal threads. The annulus 127 coupled to the fastener (as in FIG. 6) has grooves 128 the closing of which indicate that sufficient torque has been applied to make-up the joint, comprising the annulus endwise clamped between members 121 and 122. Note conical load transmitting shoulders on the annulus and members, at 130 and 131. Note also that the fastener and members 121 and 122 have a common bore diameter, although this is not a requirement in all cases.

Figure 8:
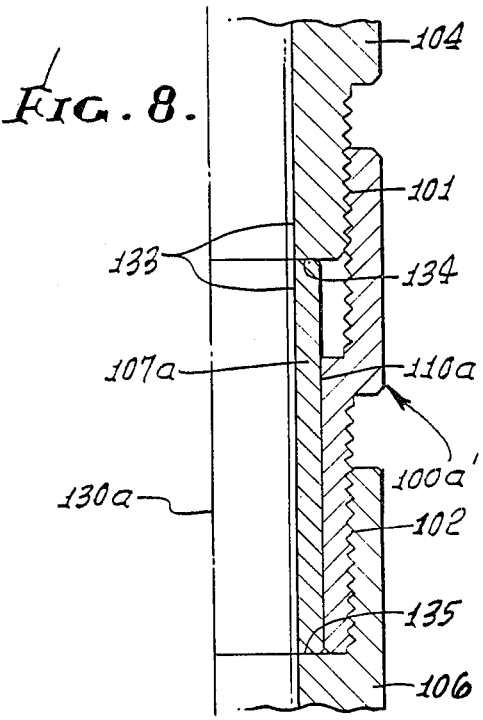
FIG. 8 is a view like FIG. 6, showing a modification.

FIG. 8 is like FIG. 6, except that the center line 103a is at the left instead of the right side of the wall sections. Annulus 107a is clamped endwise at 134 and 135 between the pipe sections 104 and 106; therefore, the need for spline interfit of annulus 107a and the fastener 100a' is eliminated. A sliding cylindrical interfit may be provided, as at 110a. A smooth bore wall appears at 133.

We claim:

1. In a fastening assembly, the combination comprising
  (a) an axially elongated fastener having axially spaced differentially threaded portions respectively adapted to threadably engage threaded extents carried on members to be interconnected, and
  (b) means at the side of the fastener characterized as facilitating transmission of torque to the fastener to rotate the fastener about said axis whereby said threaded portions are then adapted to threadably interfit said threaded extents to make-up the assembly,
  (c) and including one of said members defining an internal recess sunk into the member from an external face thereof, and an annular insert retained in the recess, said insert defining internal threaded extent threadably engaged by one of said fastener threaded portions, the recess having an interior portion spaced further from said member external face than the overall axial length of said one threaded portion of the fastener, at least a part of said one threaded portion also extending into said recess interior portion whereby upon rotation of the fastener to make-up the members the entirety of said one threaded portion of the fastener will be displaced toward said external face but will remain in said recess, (d) said means including shoulders on said fastener, said shoulders extending generally axially, the fastener maximum diameter at said shoulders being less than the maximum diameter of said one threaded portion of the fastener.

2. The combination of claim 1 wherein said means includes an annulus extending in generally coaxial relation with the fastener.

3. The combination of claim 2 wherein the annulus extends about the fastener, and including the other of the members, said members having shoulders between which loading is transmitted by the annulus.

4. The combination of claim 3 wherein the fastener comprises a bolt surrounded by said members and by said annulus.

5. The combination of claim 3 wherein the annulus has grooves sunk therein at a location to collapse in response to attainment of predetermined axial loading transmission by the annulus.

6. The combination of claim 2 wherein the annulus and the fastener shoulders define interengageable flats to transmit said torque to the fastener as the annulus is rotated.

7. The combination of claim 6 wherein the annulus initially extends about the other of said threaded portions of the fastener.

8. The combination of claim 2 wherein the annulus has a frusto-conically tapering end portion adapted to interfit a corresponding frusto-conically tapered shoulder defined by one of said members.

9. The combination of claim 2 wherein the annulus has frusto-conically tapering end portions to interfit correspondingly frusto-conically tapered shoulders defined by said members.

10. The combination of claim 9 including another of said members which includes a body and an annulur insert therein, the inserts defining the internal threaded extents to which the fastener threaded portions are respectively threadably engaged, and the insert also defining said corresponding frusto-conically tapered shoulders.

11. The combination of claim 1 wherein said fastener defines an axial through opening.

12. The combination of claim 11 including another of said members, said members being tubular and having interiors which are in open communication with said fastener through opening.

13. The combination of claim 1 wherein said axial displacement of the fastener is in a relatively forward fastener make-up direction, the forward threaded portion of the fastener having greater thread pitch than the rearward threaded portion of the fastener.

14. The combination of claim 1 wherein the fastener has a precision, locally reduced cross section between said threaded portions so as to fail at said cross section in the event of the excessive tension loading.

15. The combination of claim 1 wherein said insert has threaded engagement with said one member.

16. The combination of claim 1 including another of said members, and a crushable thrust washer between the annulus and a selected member.

17. In a fastening assembly the combination comprising
(a) an axially elongated fastener having axially spaced differentially threaded portions respectively adapted to threadably engage threaded extends carried on members to be interconnected, and
(b) means at the side of the fastener characterized as facilitating transmission of torque to the fastener to rotate the fastener about said axis whereby said threaded portions are then adapted to threadably interfit said threaded extents to make-up assembly,
(c) one of said members defining an internal recess sunk into the member from an external face thereof, and an annular insert retained in the recess, said insert defining internal threaded extent threadably engaged by one of said fastener threaded portions, the recess having an interior portion spaced further from said member external face than the overall axial length of said one threaded portion of the fastener, so that at least said one threaded portion is adapted to extend into said recess interior portion whereby upon rotation of the fastener to make-up the members the entirety of said one threaded portion of the fastener will be displaced toward said external face but will remain in said recess,
(d) said means including shoulders on said fastener, said shoulders facing generally laterally, the fastener maximum diameter at said shoulders being less than the maximum diameter of said one threaded portion of the fastener.

18. The combination of claim 17 wherein the fastener has a precision, locally reduced cross section between said threaded portions.

* * * * *